United States Patent [19]
Heathcott

[11] 3,901,517
[45] Aug. 26, 1975

[54] DYNAMIC SEAL
[75] Inventor: E. B. Heathcott, Dresden, Tenn.
[73] Assignee: Utex Industries, Inc., Houston, Tex.
[22] Filed: Oct. 11, 1972
[21] Appl. No.: 296,683

[52] U.S. Cl. ............ 277/205; 277/206 R; 277/227; 277/188
[51] Int. Cl. ............................................. F16j 15/08
[58] Field of Search .......... 277/205, 165, 152, 227, 277/230, 206 R, 233, 224; 285/111

[56] References Cited
UNITED STATES PATENTS

| | | | |
|---|---|---|---|
| 1,931,922 | 10/1933 | Damsel et al. | 277/206 |
| 2,430,836 | 11/1947 | Taylor | 277/224 X |
| 2,533,742 | 12/1950 | Poltorak | 277/205 |
| 2,639,198 | 5/1953 | Kirkham | 277/233 X |
| 3,013,830 | 12/1961 | Milligan | 277/230 X |
| 3,028,166 | 4/1962 | Adamson | 277/233 X |
| 3,271,039 | 9/1966 | Kohl et al. | 277/206 X |
| 3,331,611 | 7/1967 | Liebig | 277/206 X |
| 3,497,224 | 2/1970 | Pippert | 277/124 |
| 3,620,556 | 11/1971 | Paddington | 277/206 R |
| 3,627,337 | 12/1971 | Pippert | 277/206 R |

*Primary Examiner*—Samuel B. Rothberg
*Attorney, Agent, or Firm*—Browning & Bushman

[57] ABSTRACT

A sealing device having an annular body, at least one annular sealing lip and an annular biasing section bonded to the lip, the biasing section being comprised of a material harder than the material of the sealing lip and serving to control deformation of the lip.

10 Claims, 14 Drawing Figures

3,901,517

PATENTED AUG 26 1975

DYNAMIC SEAL

BACKGROUND OF THE INVENTION

The present invention relates to sealing devices and more particularly to seals, packings and wipers used in dynamic applications such as those involving rotating, reciprocating or oscillating shafts.

Numerous types of seal rings or packings for use in dynamic applications are known. In such applications, sealing is primarily accomplished as a result of an interference fit between the flexible sealing element, i.e. the lip of the seal ring or the packing, and the moving shaft. It will be evident that in order for adequate sealing to be maintained, the interference fit between the sealing lip of the sealing device and the moving shaft must be tight enough to prevent seepage of lubricating fluids or the like between the sealing lip and the shaft and yet not so tight that excessive frictional forces are encountered. In a word, a precise amount of contact pressure is required between the sealing lip of the ring or packing and the moving shaft. In the past, it has been the practice to employ some sort of mechanical biasing means to urge the sealing lip or lips, as the case may be, into contact with the surfaces they engage. Frequently these mechanical biasing devices take the form of metal expanders or springs as for example a garter spring which is often used with exclusion seals such as wipers. Not only are seals employing such mechanical biasing devices expensive, but it often happens that the flexible seal lip which is generally made of a synthetic resin, wears through until the mechanical biasing means makes contact with the moving member, as for example the shaft, thereby causing unnecessary wear or scoring of the shaft. This of course necessitates replacement of the seal and possible re-working of the shaft.

SUMMARY OF THE INVENTION

It is therefore an object of the present invention to provide a dynamic, lip sealing device which obviates the use of separate, mechanical biasing means to effect sealing engagement.

Still another object of the present invention is to provide a unitary sealing device having means which exerts a pre-determined amount of force on the sealing lip.

Yet another object of the present invention is to provide a unitary sealing device of the lip seal type having means for controlling deformation of the lip.

Another object of the present invention is to provide a packing for use in dynamic applications which does not require the use of expanders or support rings to effect sealing.

It is also an object of the present invention to provide a radial lip seal which does not require separate mechanical biasing to effectuate sealing.

A further object of the present invention is to provide an exclusion seal of the wiper or scraper type which does not require spring loading or other separate mechanical biasing to effect sealing.

Still another object of the present invention is to provide an improved combination of a moving shaft and a sealing device of the lip type in which the sealing device does not require separate mechanical biasing to ensure effective sealing between the shaft and the lip.

These and other objects of the present invention will become apparent from the description given herein, the drawings and the appended claims.

In general, the sealing device of the present invention comprises an annular body portion and at least one deformable annular sealing lip attached to said body portion or section. Bonded to the sealing lip, and in many cases to the body section as well, is an annular biasing section of a material having the characteristic of controlling deformation of the lip and thereby minimizing permanent set once the sealing device has been in use for extended periods.

In another embodiment, the present invention comprises a moving shaft which can be of the reciprocating, oscillating or rotating type, in combination with the abovedescribed sealing device, the shaft extending through the sealing device, the biasing section of the sealing device serving to maintain the lip or lips of the sealing device in sealing engagement with the shaft.

DESCRIPTION OF THE PREFERRED EMBODIMENTS

Generally speaking, the seals and packings which are the subject of the present invention are of the so-called lip type. In other words, the sealing device has at least one annular portion, which can be considered of a flexible or deformable nature such that when the sealing device is in use, this sealing lip will engage the moving part, or in certain cases a moving and a stationary part if seals with multiple sealing lips are used, to form an interference fit and thereby prevent leakage of fluids or the like past the seal.

Figure 1:
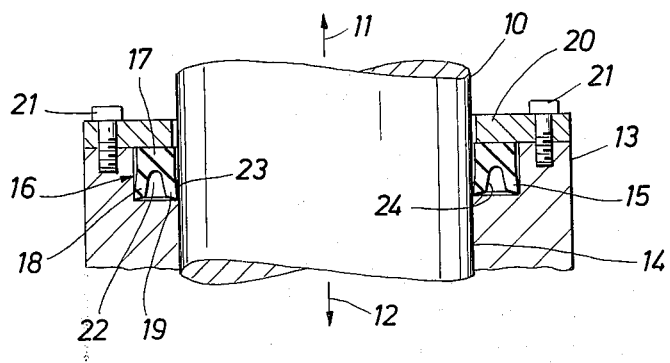
FIG. 1 is a simplified environmental view, partly in section, showing a U-shaped packing as per the present invention, used to effect sealing around a reciprocating shaft.

In order to more fully describe the invention, reference is made to the accompanying figures and in particular to FIG. 1. A reciprocating shaft 10 whose movement is indicated generally by the arrows 11 and 12 is movably mounted in a suitable fashion in a housing 13 having therein an annular opening 14 through which shaft 10 extends. Disposed in an annular stuffing box 15 between the walls of housing 13 and shaft 10 is a U-shaped packing shown generally at 16 comprised of an annular body portion 17 and a pair of annularly extending sealing lips 18 and 19 depending therefrom, sealing lips 18 and 19 sealing on outer and inner peripheries of packing 16 and forming an annular space 22 therebetween. Packing 16 is secured in space 15 by means of a back support ring 20 held by bolts 21 to housing 13. Sealing in the system shown in FIG. 1 is accomplished by an interference fit between the contacting surfaces of lip 19 and shaft 10 and between the contacting surfaces of lip 18 and housing 15. Since packing 16 is constructed of a generally resilient, flexible material, lips 18 and 19 are deformable radially inwardly and outwardly.

In the system shown in FIG. 1, there is no metal expander or the like disposed in space 22. Rather, an annularly extending biasing section 24 is bonded to the inner surfaces of lips 18 and 19 and body 17. This biasing section serves the purpose of maintaining lips 18 and 19 in a "spread" position, i.e. lips 18 and 19 are urged radially outwardly and inwardly respectively. The nature of the biasing section 24 is discussed more fully below with reference to the remaining figures.

FIGS. 2–6 and 13 and 14 all depict various U-shaped packings made in accordance with the present invention, the packings differing primarily in the materials of construction, their cross-sectional configurations and the disposition of the biasing section. In the description of the packings and seals discussed herein, the sealing lip or lips are discussed in terms of being attached to the body portion. It is to be understood that generally speaking the packing or seal is of unitary construction in the sense that the body portions and lip portions are formed as one piece as opposed to a situation wherein the lips and body portion are formed separately and then adjoined by some means. It is to be understood however that in certain applications it may be possible to form the lip section and the body section separately and then adjoin them by some suitable means.

Figure 2:
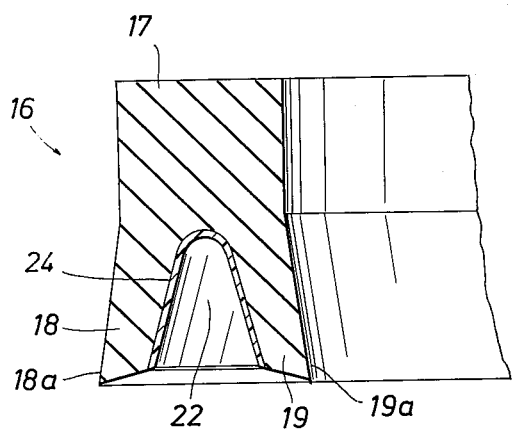
FIGS. 2–14 are cross-sectional views, in a radial plane, of various packings, wipers and seals made in accordance with the present invention and showing various configurations and types of construction which can be employed.

In FIG. 2, packing 16 of FIG. 1 is shown in enlarged cross-section. Packing 16 is a homogeneous packing being comprised of an elastomer such as synthetic or natural rubber, body portion 17 and lips 18 and 19 having the same composition. As can be seen in FIG. 2, lips 18 and 19 flare radially outwardly and inwardly respectively from a body portion 17 and are separated by an annularly extending space 22 which allows lips 18 and 19 to flex or deform from approximately the juncture of body 17 and the lips 18 and 19. Bonded to the inner surface of lips 18 and 19 and body 17 and extending annularly is biasing section 24 which being harder and somewhat more rigid than the material of body 17 or lips 18 and 19 controls the deformation of lips 18 and 19 and prevents them from taking a set after extended use. It will be seen, that biasing section 24 which can be considered as an "energizing" section in the sense that it acts to maintain a radially inwardly and outwardly force against lips 19 and 18 respectively, is on the surface of lips 18 and 19 generally opposed to the sealing surfaces 18a and 19a respectively. As will also be noted, biasing section 24 completely covers the inner surface of U-shaped packing 16 which forms space 22, i.e. it is bonded to both body portion 17 and lips 18 and 19.

Figure 3:
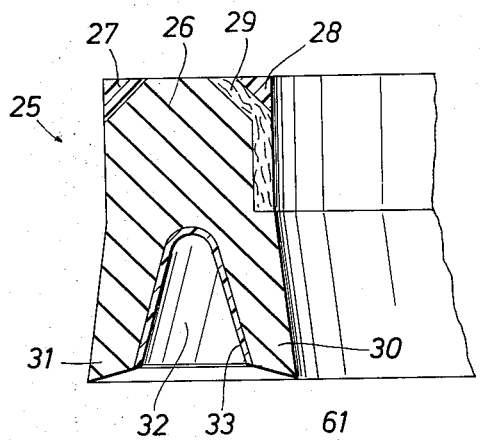

FIG. 3 shows a U-shaped packing 25, identical in configuration to that shown in FIG. 2. Packing 25 differs from packing 16 in that body section 26 contains annularly extending reinforcing heels 27 and 28 comprised of a material considerably harder than the remaining portion of body 27 and which act as anti-extrusion means. Anti-extrusion ring 28 disposed on the radially inward surface of body portion 26 is augmented by an annularly extending fabric reinforced layer 29 bonded directly to body portion 26 and heel 28 which gives the body portion 26 of seal 25 nearest the wearing surface enhanced strength. As in the case of the packing of FIG. 2, seal lips 30 and 31 and body portion 26 have bonded thereto, on the surface forming space 32, biasing section 33 which like biasing section 24 serves the function of controlling deformation of lips 30 and 31 and thereby prevents set in lips 30 and 31. As in the case of packing 16, the lips 30 and 31 and most of body section 26 are comprised of a relatively soft elastomer.

Figure 4:
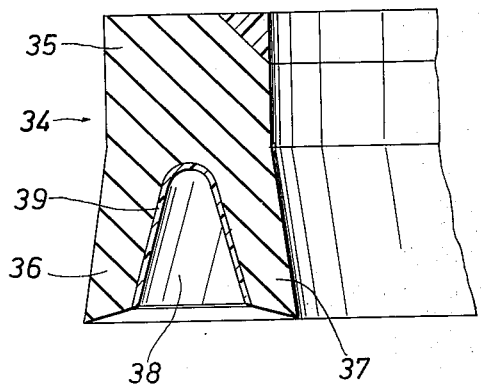

In FIG. 4 is shown U-shaped packing 34, identical in configuration with packings 16 and 25, and comprised of a body section 35, lips 36 and 37 which define an annularly extending space 38, and containing a biasing section 39. As in the case of the packings of FIGS. 2 and 3, most of body portion 35 and lips 36 and 37 are comprised of an elastomer such as synthetic or natural rubber but in this case, body portion 35 comprises, in addition, a single anti-extrusion heel 40 located at the radially inward edge of body portion 35 and made of a material generally harder than the material of body portion 35 or lips 36 and 37. The anti-extrusion rings 26, 28 and 40 can be of a material similar and in fact identical to that which forms biasing sections 24, 33 and 39.

Figure 5:
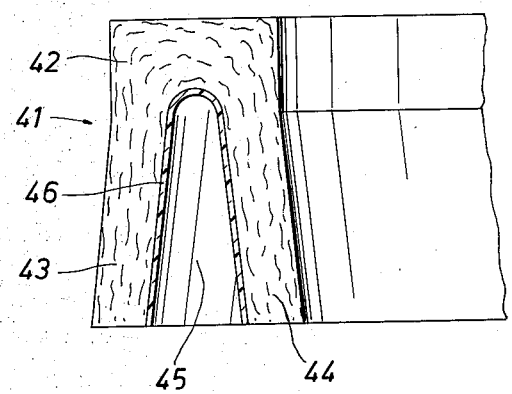

FIG. 5 shows a U-shaped packing 41 of a slightly modified configuration from that shown in FIGS. 2, 3 and 4. Packing 41 comprises body section 42, sealing lips 43 and 44 defining annularly extending space 45. Bonded to the inner surfaces of lips 43 and 44 and body section 42 is biasing section 46 whose function is as that described for packings 16, 25 and 34. Packing 41 also differs from packings 16, 25 and 34 in that it is comprised of laminations of a reinforced fabric such as layers of a suitable fabric impregnated with a thermoplastic and/or thermosetting material. The nature of these materials is discussed more fully below.

Figure 6:
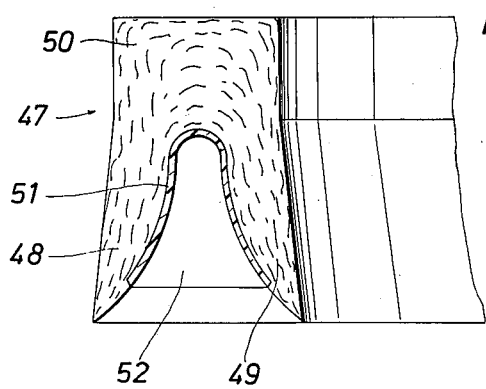

FIG. 6 shows still another U-shaped packing 47 in which the material of construction of the body portion 50 and lips 48 and 49 is similar to that of the packing of FIG. 5 but in which lip portions 48 and 49 are tapered rather than being of a generally uniform cross-sectional thickness as is the case of packings 16, 25, 34 and 41. Biasing section 51, partially defining annularly extending space 52, is bonded to body portion 50 and lips 48 and 49 but, unlike the situation in packings 16, 34 and 41, does not cover the complete inner surfaces of sealing lips 48 and 49.

Figure 13:
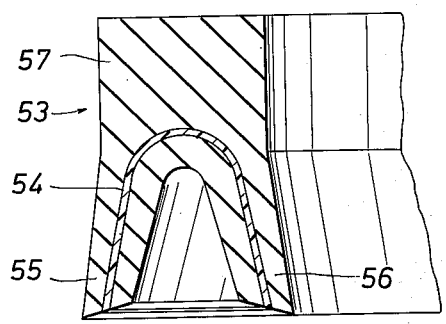

FIG. 13 shows U-shaped packing 53 having the same configuration and being made of the same material as packing 16 but being of a modified construction as regards disposition of the biasing section 54. Whereas in packing 16, biasing section 24 is bonded to the inner surface of lips 18 and 19, which as noted is a surface generally opposed to the sealing surfaces 18a and 19a, biasing section 54, albeit bonded to lips 55 and 56 and body portion 57, is imbedded therein. While biasing section 54 is located generally midway the radial thicknesses of sealing lips 55 and 56 rather than on the surfaces thereof, it still serves to act as an energizer or deformation controller.

Figure 14:
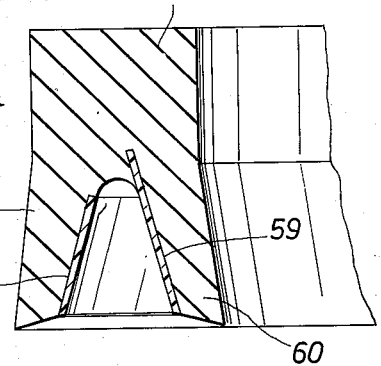

In FIG. 14 is shown still another U-shaped packing 58 which has the identical configuration of packing 16. In U-shaped packing 58, first biasing section 59 bonded to the inner surface of inner lip 60 extends into body portion 61 but is separate from second biasing section 62 bonded to the inner surface of outer lip 63. It is to be noted also that while first biasing section 59 extends into and is bonded into body portion 61, biasing section 62 extends generally only the length of lip 63. Thus it will be observed that lip 62 will be allowed to flex more than lip 60 due to the fact that the extension of biasing section 59 into body portion 61 will act to exert more control of the radially inward or outward deformation of lip 60. It is a distinct advantage of the present invention that the amount of deformation or flexure allowed the sealing lips can be controlled by varying the dimensions of the biasing section. It will be readily recognized that such control of deformation of the sealing lip can also be accomplished by varying the thickness of the biasing section, taken in a radial direction, rather than its height.

Figure 7:
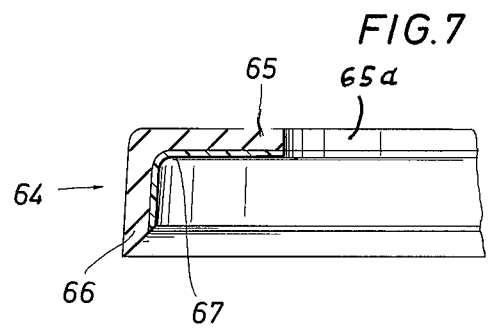

FIG. 7 depicts a U-shaped, flat bottom cup packing 64 comprised of a body portion 65 and a lip 66, body portion 65 having a circular opening 65a located centrally thereof. Bonded to the inside surface of lip 66 and body 65 is biasing section 67, biasing section 67 serving to maintain lip 66 disposed radially outwardly.

Figure 8:
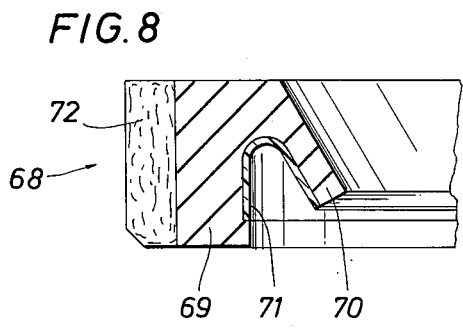

In FIG. 8 is shown a single lip oil wiper 68 comprised of an annularly extending body portion 69 and a lip 70 depending therefrom such that wiper ring 68 has a generally V-shaped cross-section in a radial plane. Biasing section 71 bonded to lip 70 and body section 69 serves to maintain lip 70 disposed radially inwardly, in effect exerting a pre-determined amount of pressure and thereby preventing permanent radial outward set of lip 70. Wiper 68 is of the composite type in that body section 69 incorporates an annularly extending reinforcing heel 72 of a fabric impregnated with a bonding material and usually of laminated construction.

Figure 9:
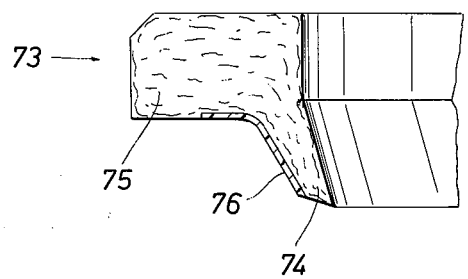

FIG. 9 shows another wiper or radial seal 73 of the single lip type wherein the lip 74 and body section 75 are of the reinforced fabric type. Biasing section 76 bonded to both body section 75 and lip 74 maintains lip portion 74 urged radially inwardly. Since biasing section 76 resists radial outward deformation of lip 74, it will be apparent that it serves to keep lip 74 from obtaining a permanent set thus reducing its sealing abilities.

Figure 10:
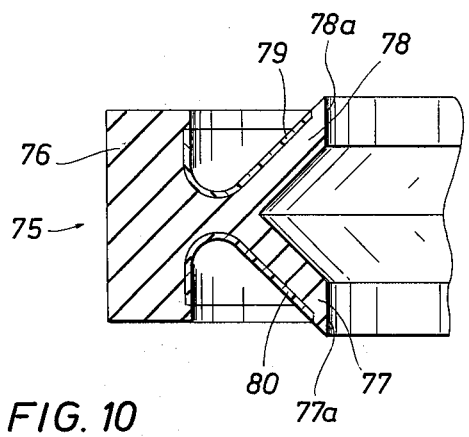

FIG. 10 shows a double lip wiper or radial seal 75 having a body section 76 and a pair of lips 77 and 78 depending radially inwardly from body 76 having seal surfaces 77a and 78a respectively. Lips 77 and 78 adjoin body portion 76 radially outwardly from sealing surfaces 77a and 78a at an angle to one another and thereby appear V-shaped in cross-section in a radial plane. Biasing sections 79 and 80 are bonded respectively to sealing lips 78 and 77 and to body portion 76 and act to maintain the free ends of sealing lips 77 and 78 disposed radially inward and toward one another.

Figure 11:
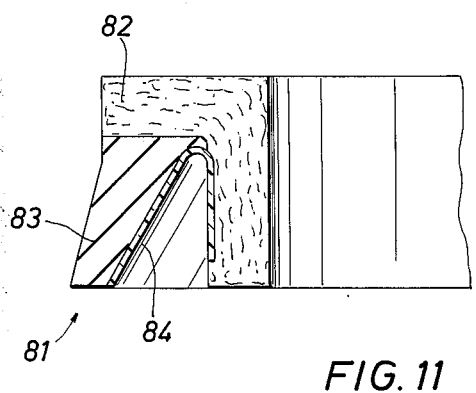

In FIG. 11 is shown a wiper or radial seal 81 of the single lip design and comprised of a reinforced fabric body 82 bonded to a resilient, elastomeric tapered lip 83. Biasing section 84 bonded to body section 82 and lip 83 acts to maintain lip 83 disposed radially outward.

It is to be observed that sealing devices shown in FIGS. 8–10 can be of the type which seal on the inside diameter or the outside diameter, i.e. whereas lips 70, 74, 77 and 78 are shown as being disposed such as to extend radially inward and thus seal on the internal diameter, the seals can be constructed such that the lips extend radially outward and thus seal on the outside diameter. The seal of FIG. 11 is an example of an outside diameter seal which of course can be made an inside diameter seal.

Figure 12:
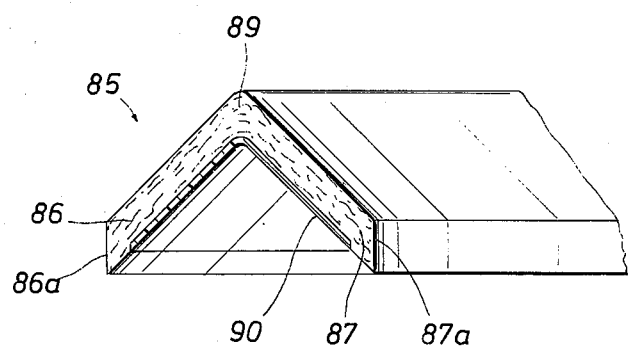

FIG. 12 depicts a fabric type V-type packing 85 comprised of lips 86 and 87 and body portion 89, body portion 89 actually constituting the apex of the intersection of lips 86 and 87. Biasing section 90 also V-shaped in a radial plane is bonded to the inner surfaces of lips 86 and 87 and body section 89 in generally opposed relationship to the sealing surfaces 86a and 87a of lips 86 and 87 respectively.

Generally speaking, the biasing or energizing section of the sealing device of the present invention will comprise a material which is harder than the material of the sealing lip and usually of the body section of the sealing device as well. The precise nature of the material used for the biasing section of the sealing devices of the present invention will of course depend upon the application to which the sealing device is put and the material of construction of the sealing lips and the body portion. However, the material of the biasing section will have the characteristic of being rigid and hard enough to control deformation of the sealing lip and yet resilient enough so as to allow flexure of the lip. Accordingly, the biasing section will be non-metallic in nature.

The material of the biasing section can comprise a thermoplastic material, a thermosetting material, a fabric reinforced thermosetting material, a fabric reinforced thermoplastic material, a mixed thermoplastic/thermosetting material or various combinations of the above. The term thermosetting as used herein applies to those resins, generally synthetic in nature, which solidify or set on heating and cannot be re-melted. Non-limiting examples of such thermosetting resins include phenolics, alkyds, amino resins, polyesters, epoxies, silicones and the like. The term thermoplastic as used herein applies to resins, generally synthetic in nature, that may be softened by heat and then regain their original properties upon cooling. Non-limiting examples of such thermoplastic materials include Nylon, polyethylene, polypropylene, cellulose and acrylic resins, polycarbonates and the like. As noted, the biasing section can comprise a thermosetting or thermoplastic material reinforced with a fibrous material which can be in the form of a cloth or as a chopped or flocked filler. The terms fabric or fibrous material, as used herein, refer to any material obtained by weaving or other such techniques wherein the matrix consists of a lattice work or web of thread-like elements. Numerous materials fall into this class such as for example, cotton, asbestos, fiberglass, nylon, polyesters, linen, rayon and the like. Furthermore, blends of various materials such as cotton-polyester fabrics, rayon-polyester fabrics, etc. may also be employed.

It will be observed that in most of the applications discussed above, the biasing or energizing section of the seal comprises a relatively thin section compared to the thickness of the sealing lip of the body portion of the sealing device. It will be understood that the relative thickness of the biasing section compared to that of either the lip or the body section will depend upon the types of materials employed in fabrication and the use to which the sealing device is put.

The biasing section can be either laminated, i.e. being comprised of several layers of a fabric reinforced material such as noted above, or can be of unitary construction, i.e. molded. In producing the sealing devices of the present invention, the biasing section can be formed separately and then bonded to the remaining part of the sealing device or the sealing divice, incorporating the biasing section, can be formed in a single step, the net result being that the sealing device is of unitary construction requiring no external mechanical biasing or springs in order to control deformation of the sealing lip. In the description given throughout, the term "bonded" is used in describing adjoining of the biasing section with the rest of the sealing device. It will be understood, and as depicted in several of the figures, bonding implies not only adhesion between two surfaces such as for example between a surface of a lip and a surface of a biasing section but refers as well to cases where the biasing section is imbedded in the lip and/or body section of the sealing device. The latter is depicted in FIGS. 13 and 14.

In the preferred case, the biasing section is comprised of a fabric, such as cotton, impregnated with a phenolic resin, the desired thickness being achieved by laminating as many layers as needed and bonding them together.

As noted from the above descriptions of the various types of sealing devices, the materials of construction can vary quite markedly depending on the application involved. For example, the sealing lips and body section can be comprised of a homogeneous, relatively soft, resilient material such as natural or synthetic rubber or some other such natural or synthetic polymer. Typical examples of such natural or synthetic polymers, having generally high resiliency, include polychlorophrene, styrene, butadiene rubbers, styrene-acrylonitrile-butadiene rubber, fluoroelastomers such as co-polymers of vinylide chloride and hexafluoropropylene, acrylate elastomers such as those prepared from esters of acrylic acid, silicone rubbers, fluorocarbon resins such as those made from tetrafluoroethylene, and the like. The body and sealing lips may also be comprised of laminated fabric type materials, as defined and listed above, bonded together and impregnated with thermosetting or thermoplastic materials as defined and listed above.

It may also be desirable in some instances to incorporate into the sealing device, and particularly the body section thereof, annular sections of anti-extrusion material. Such construction is shown in FIGS. 3, 4 and 8. In these cases, the anti-extrusion or reinforcing sections of the body portion may be comprised of layers of fibrous materials bonded together and impregnated with thermosetting and thermoplastic materials or may be sections of pure thermosetting materials generally quite hard in nature or may be combinations of such.

In most of the embodiments shown above, the biasing section may generally be considered as an annular body comprised of two adjoined annular parts, a radial inward part and a radial outward part, the latter two parts appearing as legs joined at one end when viewed in cross-section. The two legs can be at right angles, at acute angles or at oblique angles to one another, such angles of course having reference to a cross-sectional view thereof. The net result of such construction is to have an annular body with a radially inwardly and a radially outwardly protruding leg, the free ends of which resist compression towards one another. However, as observed in FIG. 14, such one piece construction is not absolutely necessary albeit preferred.

It will be understood that the various configurations and the materials of construction of the seals and packings is virtually endless. Accordingly, the configurations and materials of construction depicted in the drawings and described herein are merely illustrative and are not intended in any way to limit the scope of the invention either with regard as to the type of seal or to the type of construction employed.

I claim:
1. A sealing device comprising:
an annular body section,
at least one deformable, annular lip attached to said body section, said lip having a generally radial innermost surface and a generally radial outermost surface, one of said surfaces forming a generally circumferentially extending sealing surface, said body section and said lip being comprised of an elastomeric material, and
an annular biasing section comprising a pair of annularly extending legs having a common juncture and being disposed at an angle to one another and forming a generally radial outermost leg and a generally radial innermost leg, both of said legs being bonded to said sealing device, one of said legs being bonded to said lip on said surface opposite said sealing surface, said biasing section being comprised of a fibrous material reinforced with a polymeric material selected from the class consisting of thermosetting and thermoplastic resins and which is harder than the material of said lip and said body section and having the characteristics of sufficient resiliency to permit flexure of said lip and sufficient rigidity to resist compression of the free ends of said legs toward one another to thereby control deformation of said lip and minimize permanent set of said lip in a deformed condition.

2. The sealing device of claim 1 wherein said leg bonded to said lip comprises a relatively thin layer bonded to a surface of said sealing lip in substantially opposed relation to the sealing surface of said sealing lip.

3. The sealing device of claim 1 wherein there are a plurality of said sealing lips.

4. The sealing device of claim 1 wherein said fibrous material is selected from the class consisting of cotton, asbestos, fiberglass, Nylon, polyesters, linen and mixtures thereof.

5. A packing in accordance with claim 1 wherein said sealing device has a U-shaped cross-section in a transverse radial plane.

6. In combination with a moving shaft, a sealing device in accordance with claim 1, said shaft extending through said sealing device, the sealing surface of said lip of said sealing device engaging said shaft.

7. The sealing device of claim 1 wherein a portion of said biasing section is bonded to said body section.

8. The sealing device of claim 2 wherein said leg bonded to said lip comprises a relatively thin layer bonded to a surface of said sealing lip in substantially opposed relation to the sealing surface of said sealing lip.

9. The sealing device of claim 1 wherein at least a portion of said body section and said sealing lip are comprised of the same material.

10. The sealing device of claim 9 wherein said body section includes an annular reinforcing section of a material harder than the material of the remaining portion of said body section and said lip.

* * * * *